(12) United States Patent
Ott

(10) Patent No.: US 6,718,456 B1
(45) Date of Patent: Apr. 6, 2004

(54) PARALLEL PACK INSTRUCTION METHOD AND APPARATUS

(75) Inventor: Michael Ott, Pleasenton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 638 days.

(21) Appl. No.: 09/587,177

(22) Filed: Jun. 2, 2000

(51) Int. Cl.[7] .......................... G06F 9/315; G06F 9/305; G06F 13/40
(52) U.S. Cl. .................. 712/210; 712/223; 712/224; 712/300; 711/171; 711/172; 710/21; 710/307
(58) Field of Search ................................ 712/225, 300, 712/210, 224, 213, 223; 703/2; 711/212, 172, 171; 710/307, 317, 21; 345/501

(56) References Cited

U.S. PATENT DOCUMENTS

| | | | | |
|---|---|---|---|---|
| 5,751,295 A | | 5/1998 | Becklund et al. ............ | 345/501 |
| 5,752,001 A | * | 5/1998 | Dulong ........................... | 703/2 |
| 6,178,500 B1 | * | 1/2001 | Roth ........................... | 712/200 |

* cited by examiner

*Primary Examiner*—Daniel H. Pan
(74) *Attorney, Agent, or Firm*—Martine & Penilla, LLP

(57) ABSTRACT

Disclosed herein is a apparatus and method for packing a 16-bit number into an 8-bit result byte. The method and apparatus utilize a parallel processing right shift circuit and a filter to obtain desired results. The parallel processes are comprised of a plurality of multiplexers capable of discretely analyzing smaller groups of bits. In this manner, higher throughput may be obtained than previously known.

12 Claims, 5 Drawing Sheets

PARALLEL PACK INSTRUCTION METHOD AND APPARATUS

BACKGROUND OF THE INVENTION

1. Field of the Invention

The present invention relates generally to graphics instruction sets. More particularly, the present invention relates to an apparatus and method for implementing a pack instruction for a graphics instruction set.

2. The Prior Art

In graphics instruction sets, such as those provided in Sun Microsystems architecture, pixel formatting instructions include packing instructions which convert 16-bit or 32-bit data to a lower precision fixed or pixel format. Input values are clipped to the dynamic range of the output format. Packing applies a scale factor determined from a scale factor field in a Graphics Status Register (GSR) to allow flexible positioning of the binary point.

As it is desirable to so utilize packing instructions to enhance system performance, it is also desirable to optimize all elements carried out in such packing instructions to further enhance system performance. As is known, graphics instructions have a tendency to be resource intensive. Thus, better implementations of any or all elements within graphics units are desirable.

BRIEF DESCRIPTION OF THE INVENTION

To overcome these and other shortcomings of the prior art, disclosed herein is an apparatus and method for providing a fast, small implementation of pack instructions. As part of the packing instruction in systems such as the Sun Microsystems MAJC, a 16-bit number consisting of two eight-bit bytes must be shifted by a specified amount to the "right", resulting in an eight bit, one byte packed number. To achieve this result herein is disclosed a method and apparatus that performs this task by way of a predominantly parallel process which was heretofore unknown.

By implementing much of the process in a parallel manner, resource optimization is achieved. Such optimization results in, inter alia, faster processing of the pack in instruction, as well as enhanced parallel processing; thus, taking advantage of enhanced parallel processing devices to further optimize system performance.

BRIEF DESCRIPTION OF THE DRAWING FIGURES

DETAILED DESCRIPTION OF THE INVENTION

Persons of ordinary skill in the art will realize that the following description of the present invention is illustrative only and not in any way limiting. Other embodiments of the invention will readily suggest themselves to such skilled persons having the benefit of this disclosure.

Figure 1:
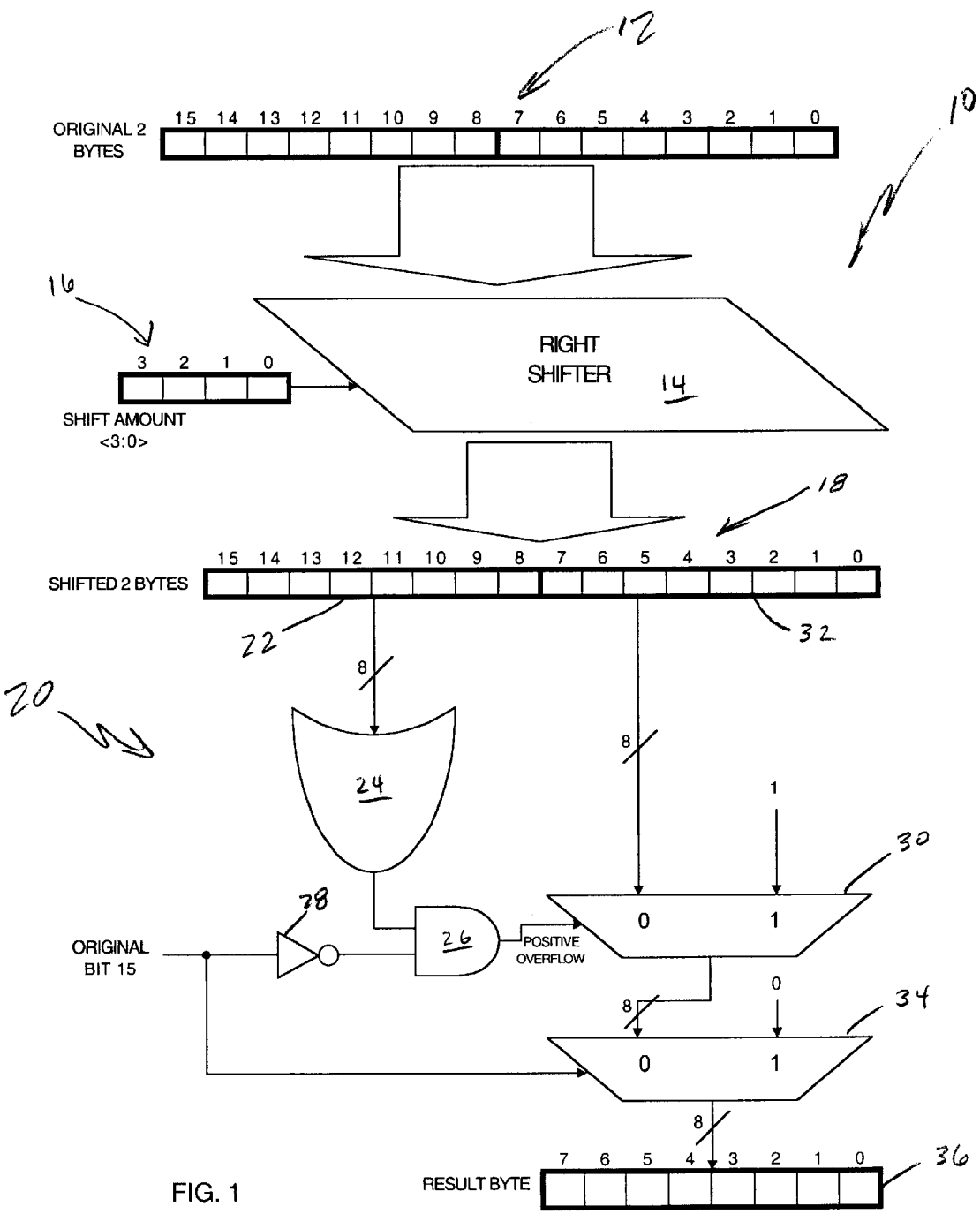
FIG. 1 is a schematic diagram depicting an overview of the present invention.

Referring to the drawing figures; wherein like numerals denote like parts throughout the various drawing figures, FIG. 1 is directed to a schematic overview of the present invention. Given that a packing instruction is intended to shift right by up to two bytes or 16-bit positions resulting in an eight bit or one byte number, FIG. 1 depicts generally an implementation 10 for achieving this result.

An original two-byte, 16-bit, data set 12 is shown. The data set 12 includes a sign bit located at bit 15 (alternatively described as ob<15> as will be discussed below). If the original bit 15 is one, for instance, this indicates that the data set 12 is a negative number. In such a situation, the resulting eight-bit byte be presented as all zeros. This implementation will achieve that result as well as other necessary outcomes as will be discussed below.

The original two bytes are fed into a right shifter circuit 14. The right shifter circuit 14 shifts the data set 12 by a shift amount 16 defined by other instructions outside the scope of this invention. The shift amount 16 may be any amount from zero to 15 as defined by a four bit number (sa<3:0>). The details of the right shifter circuit 14 will be provided hereinafter below.

Once the data set 12 has been right shifted, the resulting shifted bytes 18 are fed into a result analysis circuit 20. The upper byte 22 of the shifted bytes is analyzed to determine whether any ones are present therein. If so, an overflow condition is indicated, and the resulting eight-bit byte will be defined as all ones. That is, as will be appreciated by those individuals skilled in the art, if one or more ones are present in the upper byte, the number is greater than 255, thus reporting the greatest amount possible in an eight bit byte is logical. This results in all ones being reported as the outcome in such an instance.

To achieve these results, the upper byte 22 is fed into an OR gate 24, for example, which, if any bit in the upper byte 22 were a one, would result in a one output. That output is fed into AND gate 26 along with the inverted (at element 28) original bit 15 input. Thus, if original bit 15 is not a one (the negative case alluded to above), then a zero inverted to a one and combined with the OR gate 24 output at AND gate 26 would result in all ones being selected at multiplexer 30 if the upper byte or first shift byte 22 contains a one. This is the positive overflow case. It should be noted that certain circuit simplifications could be implemented without departing from the scope of this invention. For instance, elements 28 and 26 may be removed allowing output from 24 to go directly to the select line of multiplexer 30 without the necessity of prior combination with ob<15>.

On the other hand, if the upper byte 22 did not include a one and ob<15> is zero, then further analysis is required with a view towards lower byte or second shift byte 32 and the negative case. That is, if original bit 15 is a one, the negative case is implicated. That 1 becomes the select for multiplexer 34 resulting in an all zero output for resulting byte 36.

On the other hand, if the original bit 15 is zero (indicating a positive number) and the right-shifted two bytes are less than 255, then that 8 bit byte of the lower byte 32 will be the result byte 36. This has been an overview of the device now to be described in detail. Table 1 includes a truth table for this circuitry.

TABLE 1

| ob<15> | positive overflow | result |
|--------|-------------------|--------|
| 0 | 0 | second shift byte (ssb) |
| 0 | 1 | 1 |
| 1 | 0 | 0 |
| 1 | 1 | 0 |

Certain nomenclature will be used throughout this description and in the drawing figures. That nomenclature will now be explained by way of example. The nomenclature "<3:0>" represents a four-bit number including bits 3, 2, 1, and 0. Likewise, a 16-bit number would be defined as<15:0>, where the four bits 5 through 8 would be represented as<8:5>. Thus, ob<15> will be mentioned throughout this description and will be intended to stand for bit 15 of the original two byte data set 12. Furthermore, the shift amount sa<3:0> shown in FIG. 1 and other drawing figures corresponds with the 4-bit shift amount number described above.

Figure 2:
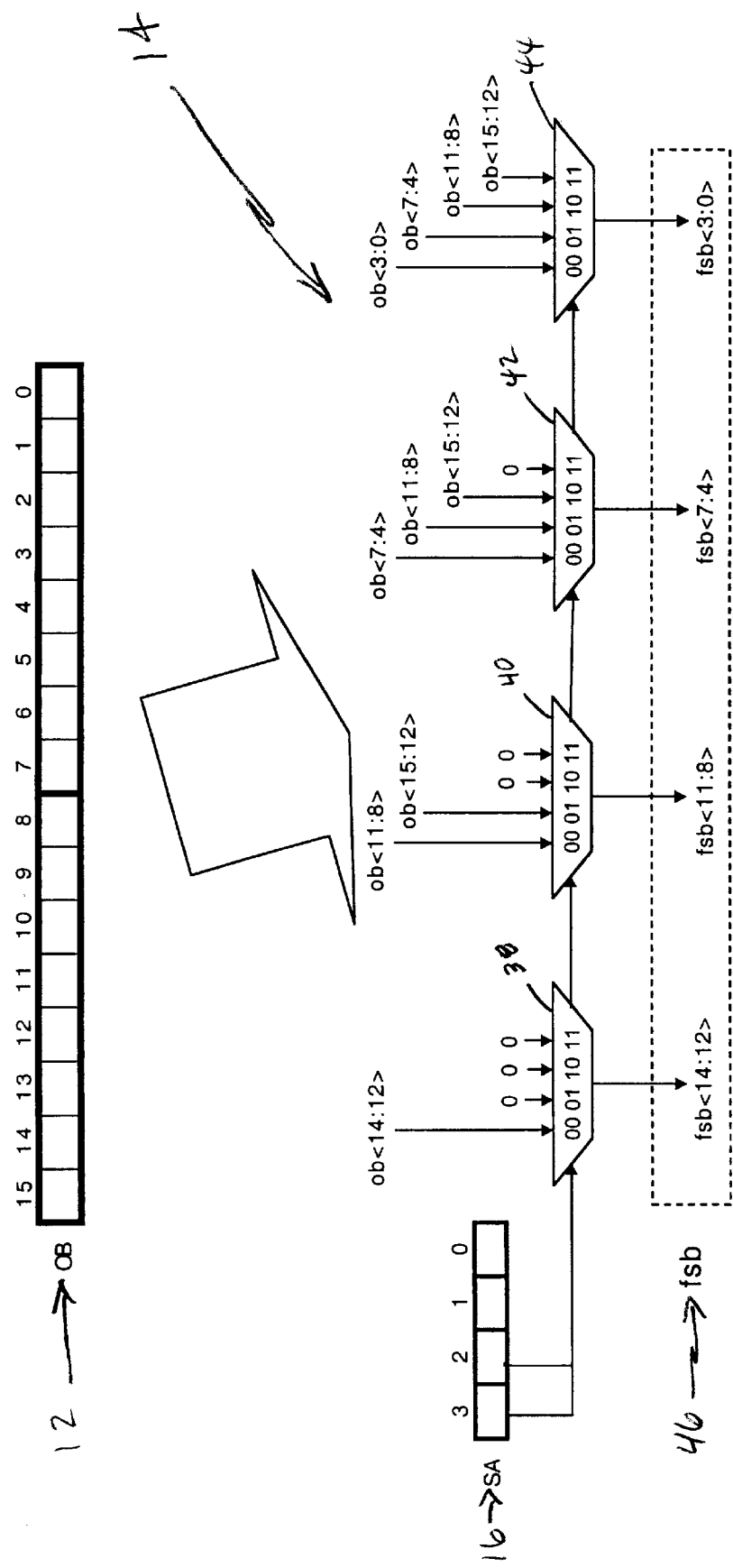
FIG. 2 is a schematic diagram of an initial processing procedure of the present invention.

Referring now to FIG. 2, further detail regarding a first portion of the right shifter circuit 14 will now be described. As indicated, as mentioned above, the original two bytes 12 are fed into the right shifter circuit 14. The first portion of the right shifter circuit 12 includes a plurality of multiplexers 38, 40, 42, and 44 in parallel all having as their select lines bit 2 and 3 of the shift amount number or sa<3:2>. The inputs for the mulitplexers are either predefined (zero) or bits from the original two bytes 12. This portion of the right shift circuit results in a first shift bit or fsb 46. However, this result is not a true result in that fsb 46 merely becomes an input for the next portion of the circuit to be described below regarding FIG. 3.

More specifically, bits 12 through 14 of the original two bytes 12 are presented to one of the input lines of multiplexer 38, while the other input lines are all presented with zeros. As indicated previously, the select line for multiplexer 38 is presented with sa<3:2>. Again, the shift amount is a 4-bit number that is presented as part of the instruction set indicating an amount between zero and 15 to shift. If the upper two bits, sa<3:2> are both zero, for example, for the portion of the circuit depicted in FIG. 2 and now being described, this is interpreted as "shift by zero." In that case, ob<14:12> would be an appropriate output from multiplexer 38. However, if sa<3:2> is 01 (shift by four), (shift by eight), or 11 (shift by twelve), then the output at multiplexer 38 will necessarily be zero (as this multiplexer is only handling bits 12 through 14 and these shifts would preclude those bits). That is, a shift by four would result in 0000 in front of bits ob<14:4>, while a shift by 8 would result in eight zeros (00000000) in front of ob<14:8>, and so forth. Please note that due to the significance of ob<15> as a sign bit, it is dealt with elsewhere in the circuitry as will now be appreciated to those skilled in the art informed by this disclosure.

Figure 3:
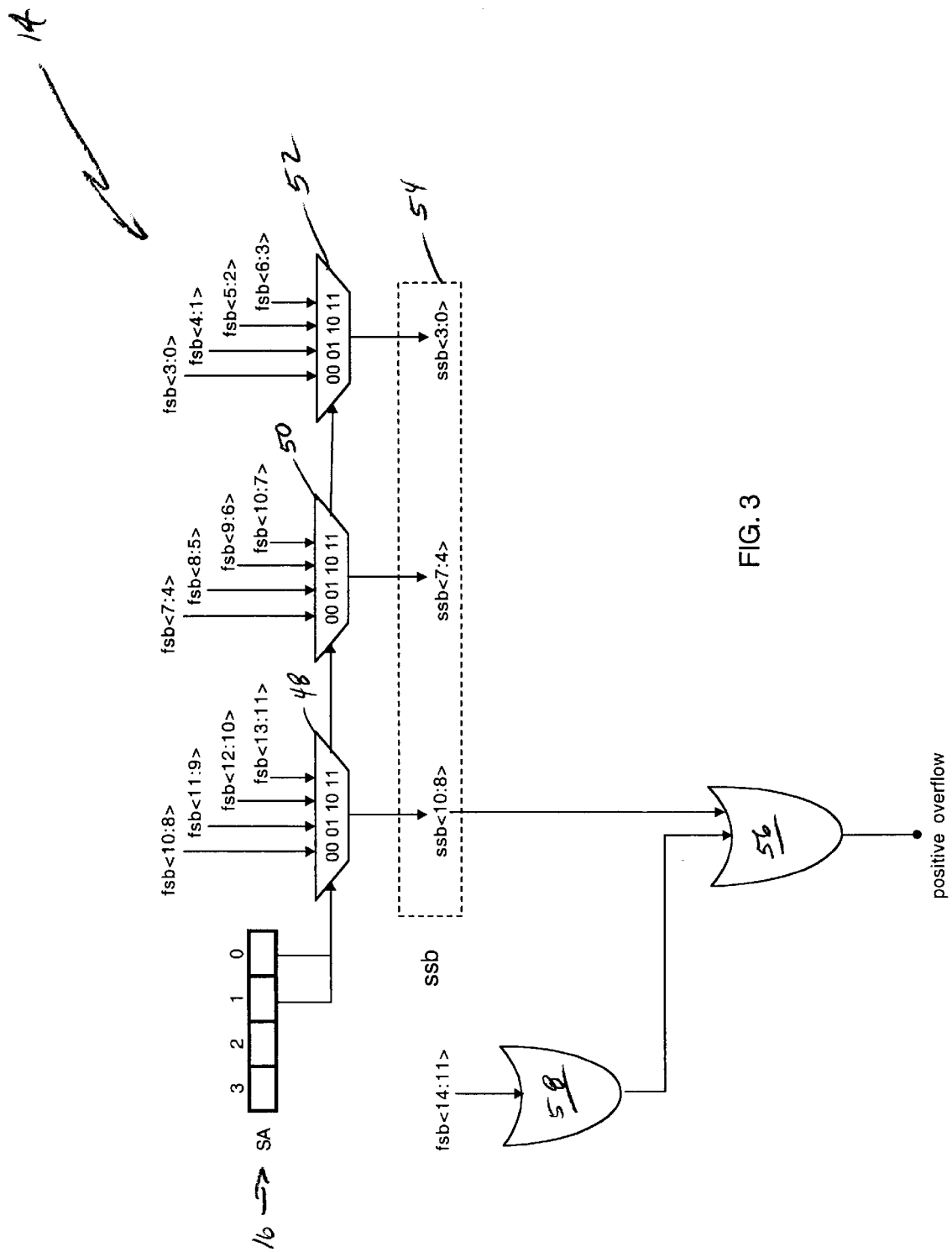
FIG. 3 is a schematic diagram of a further processing procedure of the present invention.

Thus, each multiplexer is configured to provide an output for the right-shift by zero, four, eight, or twelve bit locations, while the next portion of the circuit in FIG. 3 will focus on the shift by zero, one, two, or three bit locations (as added to the first set of multiplexer shifts). Therefore, continuing, multiplexer 40 will provide ob bit value outputs if the shift is by zero or four but not by eight or twelve. That is, if the shift amount is 00 (shift by zero), the first multiplexer 38 will have provided the upper bits for fsb 46 or fsb<14:12> which is ob<14:12>, while multiplexer 40 will provide the next four lower bits or fsb<11:8> which is ob<11:8>. However, if the shift is by 01 (or four), fsb<14:12> will be 000, while fsb<11:8> will be ob<15:12> (where fsb stands for "first shift bit").

Therefore, if the shift amount is by eight or sa<3:2>=10, then the output of multiplexer 38 will be fsb<14:12>=000, the output of multiplexer 40 will be fsb<11:8>=0000, and the output of multiplexer 42 will be fsb<7:4>= ob<15:12>. Likewise, if sa<3:2>=11 (shift by twelve), then fsb<14:12>= 000, fsb<11:8>=0000, fsb<7:4>=0000, and fsb<3:0> from multiplexer 44 would be ob<15:12>. Table 2 below provides these outcomes.

TABLE 2

| sa<3:2> | fsb<14:12> | fsb<11:8> | fsb<7:4> | fsb<3:0> |
|---------|------------|-----------|----------|----------|
| 00 | ob<14:12> | ob<11:8> | ob<7:4> | ob<3:0> |
| 01 | 000 | ob<15:12> | ob<11:8> | ob<7:4> |
| 10 | 000 | 0000 | ob<15:12> | ob<11:8> |
| 11 | 000 | 0000 | 0000 | ob<15:12> |

To complete the right shifting then, as alluded to above, and referring now to FIG. 3, the remainder of the right shifter circuit 14 is depicted. Another three multiplexers 48, 50, and 52 are provided in parallel including the fsb 46 provided as input to those multiplexers, sa<1:0> providing the select line data, and now having the ssb (or second shift bits) 54 as the output. The focus of this portion of the right shifter circuit 14 is on the lower two bits of the shift amount, or the shift by 0, 1, 2, or 3 bit locations.

The first multiplexer 48 is adapted to handle part of the special case positive overflow discussed above. The result of multiplexer 48 is ssb<10:8> which are the 3 bits above the resulting ssb 7-bit byte. If one of the bits of ssb<10:8> is one, a positive overflow condition is indicated. Additionally, the fsb<14:11> bits perform alike purpose. If one of the bits of fsb<14: 11> is one, a positive overflow condition is also implicated. Thus, fsb<14:11> is provided as input to OR gate 58 to determine if any of its bits are one. The output of OR gate 58 is combined as input with ssb<10:8> for OR gate 56. Thus, in combination, if either fsb<14:11> includes a one or ssb<10:8> includes a one, the output of OR gate 56 would be a one resulting in a positive overflow indication. Otherwise, a positive overflow state is not present and a zero output at OR gate 56 will be the result.

Hence, the remainder of ssb 54, ssb<7:0> is the desired right shifted and truncated 7-bit byte. Therefore, multiplexers 50 and 52 complete the right shifting process by taking as input the appropriate fsb 46 bits appropriately selected by the sa<1:0> select line input and outputting ssb<7:4> and ssb<3:0>. A truth table for this portion of the circuit is provided at Table 3.

TABLE 3

| sa<1:0> | ssb<10:8> | ssb<7:4> | ssb<3:0> |
|---------|-----------|----------|----------|
| 00 | fsb<10:8> | fsb<7:4> | fsb<3:0> |
| 01 | fsb<11:9> | fsb<8:5> | fsb<4:1> |
| 10 | fsb<12:10> | fsb<9:6> | fsb<5:2> |
| 11 | fsb<13:11> | fsb<10:7> | fsb<6:3> |

Figure 4:
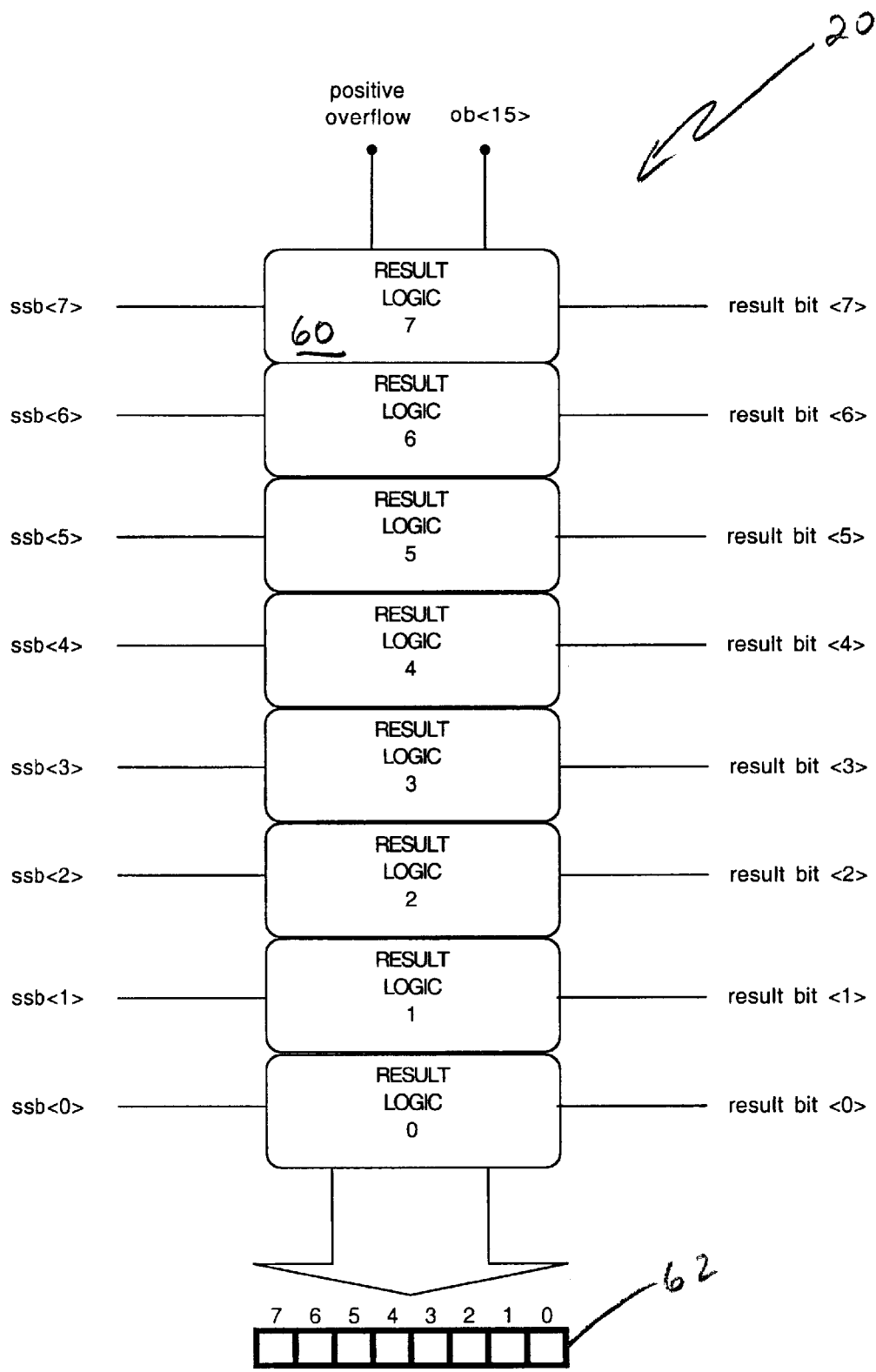
FIG. 4 is a schematic diagram of an overview of a resulting logic circuit of the present invention.

Referring now to FIG. 4, having thus obtained certain necessary elements for (namely, ssb<7:0>, positive overflow indication, and ob<15>), those fed into result logic circuit 20 to obtain the ultimate result bits required. That 7:0>, the positive overflow result, and ob<15>, the resulting 8-bit result obtained. This is accomplished by presenting each bit of ssb<7:0> in plurality of result logic circuits 60 along with the positive overflow result Table 4 indicates the result bit<7:0> truth analysis for this circuit 20.

TABLE 4

| ob<15> | positive overflow | result |
|---|---|---|
| 0 | 0 | ssb<7:0> |
| 0 | 1 | 11111111 |
| 1 | 0 | 00000000 |
| 1 | 1 | 00000000 |

Figure 5:
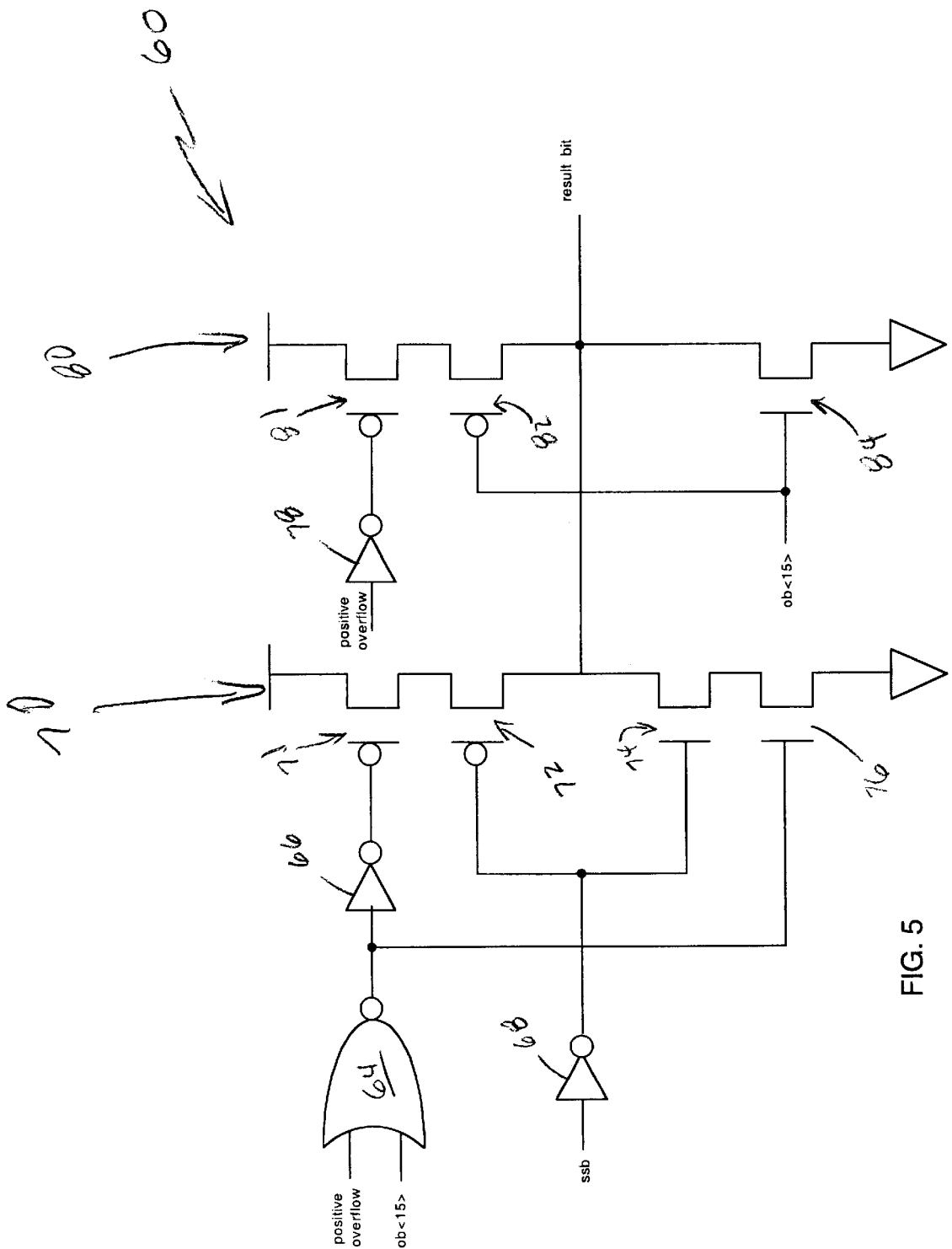
FIG. 5 is a schematic diagram of one possible implementation of the circuitry of the resulting logic circuit elements of the present invention.

Referring now to FIG. 5, one possible implementation of the circuitry with each result logic 60 element is depicted. The results of Table 4 may be obtained by such a circuit given positive overflow from FIG. 3, ob<15> from the sign bit of the original two byte number, and each bit from ssb<7:0> as obtained in FIG. 3. That is, the circuit depicted in FIG. 5, may be included within each result circuit 60, one per ssb bit.

Thus, for example, ssb<7> may be provided to result logic 60 as defined by the circuit of the positive overflow result obtained in FIG. 3, and ob<15>. More particularly, the positive overflow indicator and ob<15>are presented to NOR gate 64. If either positive overflow exists or ob<15> is 1 indicating a negative number, the ouput from NOR gate 64 will be 0 causing the left transistor circuitry 70 to float and implicating the right transistor circuitry 80. In which case, the right hand circuitry will provide a result bit <7> as 1 (or high) if positive overflow is indicated, or result bit <7> as 0 (or low) if ob<15> is a 1.

That is, if positive overflow is one or high, that input will be inverted at inverter 78 causing transistor 80 to close to high at junction 81 and if ob<15> is zero completing the close to high at junction 82. On the other hand, if there is no positive overflow, the low or zero input at inverter 78 will result in transistor 80 remaining open high, but if ob<15> is 1, junction 84 will close resulting in result bit<7> as zero or low.

Alternately, if both ob<15> and positive overflow are zero (not a negative number and no positive overflow), the remote junctions 71 and 76 will close since the output from NOR gate 64 will result in a 1 or high and the output from inverter 66 will result in a zero or low. Thus if ssb<7> is a 1 or high, it will be inverted to zero by inverter 68 resulting injunction 72 closing and result bit <7> as 1. If, on the other hand, ssb<7> is a 0 or low, then it will be inverted by inverter 68 resulting in a 1 or high closing junction 74 and obtaining result bit <7>as 0. In this manner, one possible implementation of result Table 4 is obtained, however, as one skilled in the art now informed by this disclosure is aware, many other alternate logical circuits may be utilized to obtain these same results. Thus, the circuit of FIG. 5 is illustrative only and not intended to be limiting.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for packing a 16-bit number into an 8-bit result instruction byte, comprising in combination:

providing the 16-bit number to a right shift circuit, wherein said right-shift circuit is selectively activated in parallel as a function of a 4-bit shift amount number;

obtaining a result from said right-shift circuit in the form of 2 shifted 8-bit bytes; and filtering said 2 shifted 8-bit bytes to obtain an 8-bit result instruction byte.

2. The packing method of claim 1 further comprising providing a plurality of multiplexers acting in concert to comprise said right-shift circuit.

3. The packing method of claim 2 further comprising:

utilizing the 2 highest order bits from said shift amount number as multiplexer select lines for a first group of said plurality of multiplexers; and utilizing the 2 lowest order bits from said shift amount number as multiplexer select lines from a second group of said plurality of multiplexers.

4. The packing method of claim 3 further comprising providing all ones as result bits if said filtering determines that the post shifted 16-bit number was greater then 255.

5. The packing method of claim 4 further comprising providing all zeros as result bits if said filtering determines that the original 16-bit number was a negative number.

6. The packing method of claim 5 further comprising providing said 8-bit result from said right-shift circuit if the 16-bit number was less than 256 and not negative.

7. A 16-bit to 8-bit number packing circuit, comprising in combination:

a parallel processing right-shift circuit for right-shifting the 16-bit number, said right shift circuit selectively activated by a 4-bit shift amount number; and a filter circuit operatively coupled to an output of said right-shift circuit, wherein said filter circuit filters said output to obtain an 8-bit result instruction byte.

8. The 16-bit to 8-bit number packing circuit of claim 7 further comprising:

a first group of multiplexers arranged in parallel, operatively selectable by the two highest order bits of said 4-bit shift amount number; and a second group of multiplexers arranged in parallel operatively selectable by the two lowest order bits of said 4-bit shift amount number.

9. The 16-bit to 8-bit number packing circuit of claim 8 further comprising a plurality of result logic circuits arranged in parallel forming said filter circuit.

10. The 16-bit to 8-bit number packing circuit of claim 9 further comprising:

an first input for each said result logic circuits comprising an ordered bit from said output of said right-shift circuit;

a second input for each said result logic circuits comprising an indication of positive overflow of the 16-bit number;

a third input for each for each of said result logic circuits comprising the highest order bit from the 16-bit number; and an output from each of said result logic comprising one bit of said 8-bit result instruction byte.

11. A method for packing a 16-bit number into an 8-bit result instruction byte, comprising in combination:

providing the 16-bit number to a right shift circuit, wherein said right-shift circuit is selectively activated in parallel as a function of a 4-bit shift amount number;

providing a plurality of multiplexers acting in concert to comprise said right-shift circuit;

utilizing the 2 highest order bits from said shift amount number as multiplexer select lines for a first group of said plurality of multiplexers;

utilizing the 2 lowest order bits from said shift amount number as multiplexer select lines from a second group of said plurality of multiplexers;

obtaining a result from said right-shift circuit in the form of 2 shifted 8-bit bytes; and filtering said 2 shifted 8-bit bytes to obtain an 8-bit result instruction byte.

12. A 16-bit to 8-bit number packing circuit, comprising in combination:

a parallel processing right-shift circuit for right-shifting the 16-bit number, said right shift circuit selectively activated by a 4-bit shift amount number;

a first group of multiplexers arranged in parallel, operatively selectable by the two highest order bits of said 4-bit shift amount number;

a second group of multiplexers arranged in parallel operatively selectable by the two lowest order bits of said 4-bit shift amount number; and a filter circuit operatively coupled to an output of said right-shift circuit, wherein said filter circuit filters said output to obtain an 8-bit result instruction byte.

* * * * *